United States Patent
Rogers

(10) Patent No.: US 6,722,307 B1
(45) Date of Patent: Apr. 20, 2004

(54) BUOYANT PLATFORM FOR DOGS

(76) Inventor: Barry H. Rogers, 1411-J N. Valley Mills Dr., PMB 280, Waco, TX (US) 76710

( * ) Notice: Subject to any disclaimer, the term of this patent is extended or adjusted under 35 U.S.C. 154(b) by 0 days.

(21) Appl. No.: 10/372,543

(22) Filed: Feb. 24, 2003

(51) Int. Cl.$^7$ ............................................. B63B 17/00
(52) U.S. Cl. ..................................... 114/362; 182/206
(58) Field of Search ........................... 114/362; 14/71.1, 14/71.3, 71.5, 71.7; 119/843, 847; 182/194, 206; D30/119

(56) References Cited

U.S. PATENT DOCUMENTS

| | | | |
|---|---|---|---|
| 1,562,276 A | 11/1925 | Assenzio | |
| 3,891,053 A | 6/1975 | Burton | 182/97 |
| 4,545,315 A | * 10/1985 | Becherer | 114/61.1 |
| 5,515,806 A | 5/1996 | McCabe | 114/362 |
| 5,829,380 A | * 11/1998 | Smith | 114/362 |
| D404,143 S | 1/1999 | Grey, Jr. | D25/62 |
| D412,224 S | 7/1999 | Adler | D30/119 |
| 6,273,774 B1 | 8/2001 | Warzecha | 441/129 |

* cited by examiner

*Primary Examiner*—Jesus D. Sotelo
(74) *Attorney, Agent, or Firm*—Sturm & Fix LLP

(57) ABSTRACT

A buoyant platform (10) for dogs that is adapted to be releasably connected to an above waterline structure (100) wherein, the buoyant platform (10) includes a pair of flotation arm members (21) (22) having a generally rigid platform member (40) connected across the spaced inboard ends of the flotation arm members (21)(22) and a ramp member (30) suspended between the flotation arm members (21) (22) wherein, the ramp member (30) has an outboard end that is provided with a generally U-shaped spacer bar (36) that defines an enlarged submerged ramp entrance and which is operatively connected to the spaced outboard ends of the flotation arm members (21) (22).

18 Claims, 2 Drawing Sheets

BUOYANT PLATFORM FOR DOGS

CROSS REFERENCE TO RELATED APPLICATIONS

Not applicable.

BACKGROUND OF THE INVENTION

1. Field of the Invention

The present invention relates to the field of buoyant devices in general and in particular to a buoyant platform that will provide access for a dog to a dock or a boat.

2. Description of Related Art

As can be seen by reference to the following U.S. Pat. Nos. 6,273,774; 3,891,053; 5,515,806; and, U.S. Des. Pat. No. 412,224, the prior art is replete with myriad and diverse constructions that are specifically designed to allow a dog to gain access to a boat, dock or land vehicle.

While all of the aforementioned prior art constructions are more than adequate for the basic purpose and function for which they have been specifically designed, they are uniformly deficient with respect to their failure to provide a simple, efficient, and practical buoyant platform for dogs that not only provides access to a dock or boat, but which also provides a resting platform for the dog when the dog's presence on the dock or the boat is not desired.

As anyone who owns a water dog is all to well aware, these animals have an unrelenting desire to continually retrieve items thrown into a body of water and the very first thing that they do after completing a retrieve is to shake themselves off, thereby soaking everything and anyone in their immediate vicinity.

As a consequence of the foregoing situation, there has existed a longstanding need among owners of water dogs for a new and improved buoyant platform for dogs which will allow the dog to climb out of the water and onto an intermediate platform upon which to rest and/or shed water prior to climbing onto a dock or boat.

BRIEF SUMMARY OF THE INVENTION

Briefly stated, the buoyant platform for dogs that forms the basis of the present invention comprises in general a flotation unit, a lower ramp unit suspended from the flotation unit, and an upper platform unit that rests on the flotation unit.

As will be explained in greater detail further on in the specification, the flotation unit comprises a pair of generally cylindrical flotation arm elements, which are operatively connected to both the upper platform unit and the lower ramp unit.

In the preferred embodiment of the invention, the lower ramp unit comprises a generally rectangular flexible ramp member fabricated from a sheet of flexible material that is dimensioned to support a dog when suspended from the flotation arm elements of the flotation member wherein, the flexible platform member is further provided with a generally U-shaped spreader bar that forms a downwardly depending enlarged scoop opening to facilitate the access of a dog onto the ramp member.

Furthermore, the upper platform unit which includes a generally rigid contoured upper platform member that provides an elevated, dry resting platform for a dog wherein the upper platform member is provided with conventional securing elements that are adapted to be releasably connected to a dock, duck blind, boat, etc.,

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
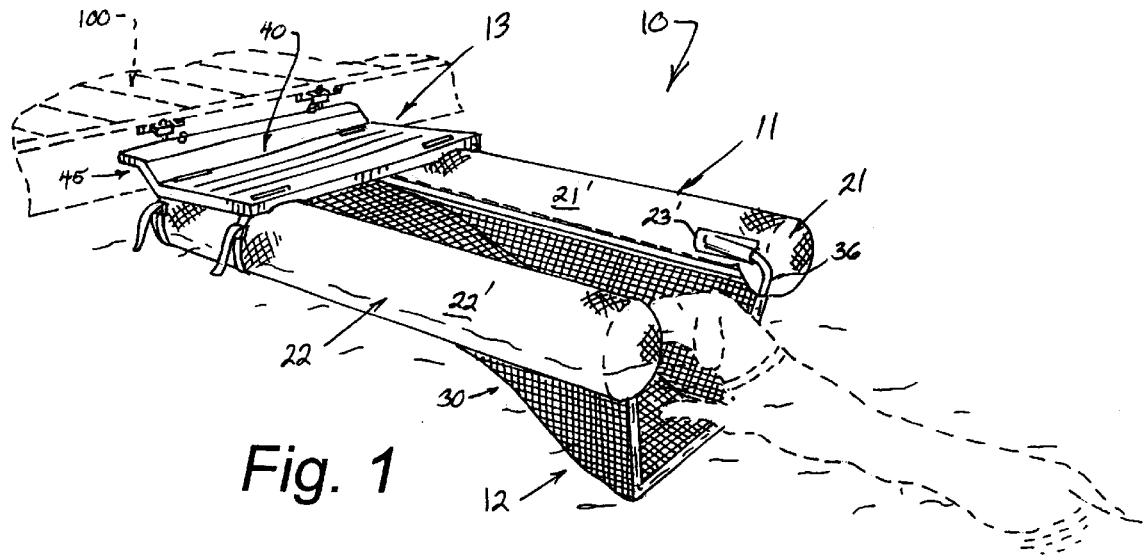
FIG. 1 is a top perspective view of the buoyant platform that forms the basis of the present invention in use.

As can be seen by reference to the drawings, and in particular to FIG. 1, the buoyant platform for dogs that forms the basis of the present invention is designated generally by the reference number 10. The buoyant platform 10 comprises in general a flotation unit 11, a lower flexible ramp unit 12 and an upper generally rigid platform unit 13. These units will now be described in seriatim fashion.

As can best be seen by reference to FIGS. 1 and 4, the flotation unit 11 comprises a pair of generally elongated cylindrical flotation arm members 21 22 each encased in a fabric envelope 21' 22' wherein the outboard ends of the fabric envelopes 21' 22' are provided with a pair of opposed pockets 23' 23' the purpose and function of which will be described presently.

In the preferred embodiment of the invention, the flotation arm members 21 22 are fabricated from contoured blocks of buoyant material 24 such as foamed plastic or the like. However, it is to be understood that this invention also contemplates the use of inflatable chambers for the pair of flotation arm members 21 22 which are intended primarily as the suspension support means for the lower ramp unit 12 and the upper platform unit 1, as will be explained next.

Figure 4:
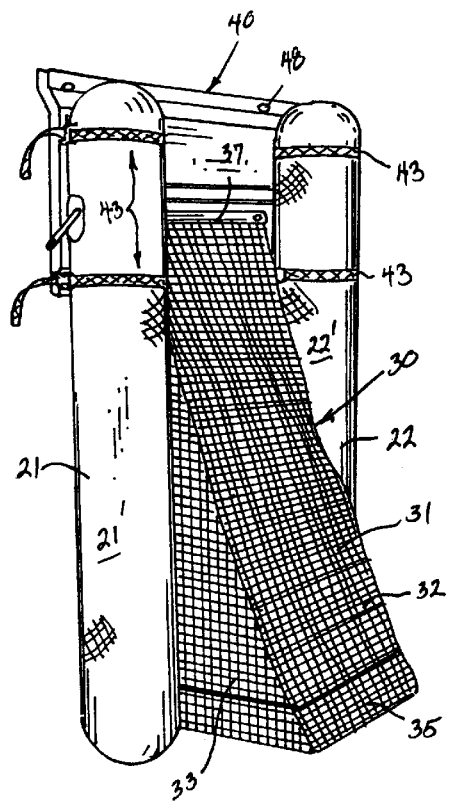
FIG. 4 is a bottom perspective view of the buoyant platform.
Figure 5:
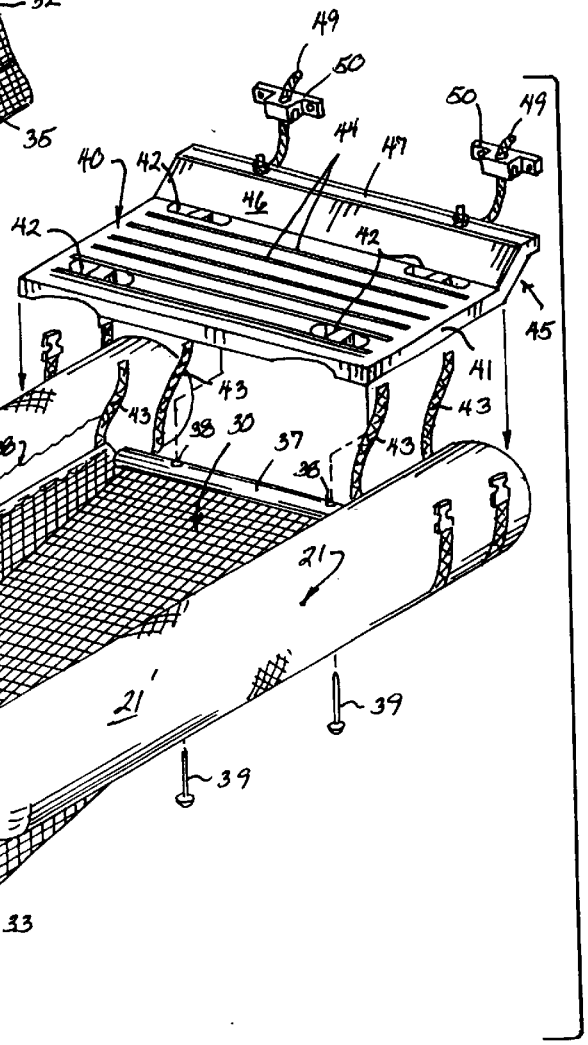
FIG. 5 is an exploded perspective view of the buoyant platform.

Turning now to FIGS. 1, 4, and 5, it can be seen that the lower ramp unit 12 comprises a lower ramp member 30 that is suspended from the pair of flotation arm members 21 22 and includes a sheet of flexible material 31 such as nylon netting, canvas or the like that is operatively attached to and suspended from the pair of flotation arm members 21 22 wherein, the ramp member 30 has a generally rectangular central panel 32 flanked by a pair of generally triangular opposed side panels 33 34.

Furthermore, as can best be appreciated by reference to FIG. 5, the outboard end of the ramp member 30 is provided with an open ended sleeve element 35 that is dimensioned to threadedly receive a generally U-shaped spreader bar 36 having rearwardly directed elements 36' that are slidably received in the pockets 23' 23' in the fabric envelopes 22' 21' encasing the flotation members 22 21.

In addition, the inboard end of the ramp member 30 is fixedly attached to a generally rigid spacer rod 37 and, the upper edges of each of the triangular shaped side panels 33 34 are fixedly secured as by stitching to the fabric envelopes 21' 22' encasing the flotation members 21 22.

As a consequence of the foregoing situation, the outboard end ramp member 30 defines an enlarged downwardly depending submerged entrance onto the upwardly sloped rectangular central panel 32 of the ramp member 30 to facilitate the access of a dog onto the ramp member 30 and then onto the upper platform unit 13.

Figure 2:
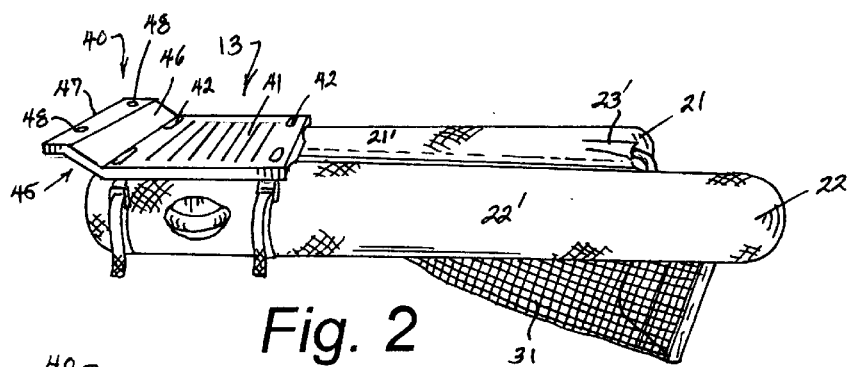
FIG. 2 is a side elevation view of the buoyant platform.
Figure 3:
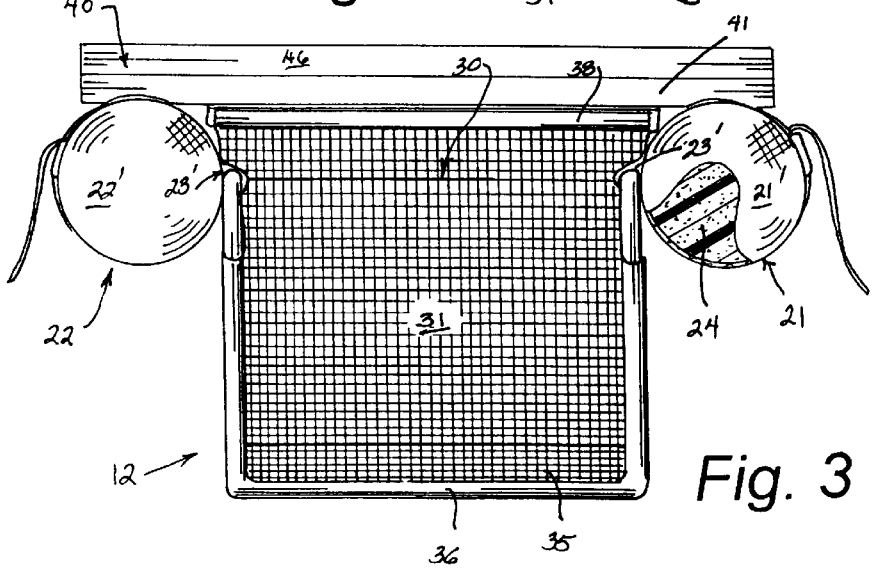
FIG. 3 is a front elevation view of the buoyant platform.

Turning now to FIGS. 1, 2, and 5, it can be seen that the platform unit 13 comprises a generally rigid contoured platform member 40 having an enlarged generally rectangular support panel 41 provided with a plurality of apertures 42 dimensioned to receive a plurality of securing straps 43 for attaching the platform member 40 to the pair of flotation members 21 22 and a plurality of drainage slots 44 to allow water to drain from the surface of the support panel 41 in a well recognized fashion.

In addition, the inboard end of the support panel 41 is further provided with a contoured flange 45 having an upwardly angled segment 46 that terminates in a truncated horizontal segment 47 provided with a plurality of apertures 48 dimensioned to receive tethers 49 that are operatively associated with mounting brackets 50 that can be installed on an above waterline structure 100.

Furthermore, as can best be seen by reference to FIG. 5, the rigid spacer rod 37 of the ramp member 30 may be provided with apertures 38 dimensioned to receive elongated fasteners 39 that pass through and secure the spacer rod 37 to the underside of the enlarged support panel 41 of the rigid platform member 40.

At this juncture, it should be noted that the flotation arm members 21 22 are primarily maintained in a parallel spaced relationship relative to one another by virtue of both the U-shaped spreader bar 36 disposed on the strap elements 43 43 which affix the inboard ends of the flotation arm members 21 22 at a spaced location relative to one another.

In addition, the spacer rod 37 also assists in maintaining the spacing of the inboard ends of the flotation arm members 21 22 relative to one another in a well recognized fashion.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A buoyant platform for dogs that is adapted to be releasably connected to an above waterline structure wherein the buoyant platform comprises a flotation unit including a pair of flotation arm members each having an inboard end and an outboard end a lower ramp unit including a ramp member suspended from said pair of floatation arm members and having an inboard end and an outboard end first means associated with the outboard end of the ramp member for maintaining the outboard ends of the flotation arm members at a spaced distance from one another an upper platform unit including a generally rigid platform member; and, second means associated with said platform member for maintaining the inboard ends of the flotation arm members at a spaced distance from one another.

2. The buoyant platform as in claim 1; wherein, the ramp member has minimal to negative buoyancy.

3. The buoyant platform as in claim 2; wherein, the ramp member is fabricated from a flexible fabric.

4. The buoyant platform as in claim 3; wherein, said flexible fabric is nylon netting.

5. The buoyant platform as in claim 1; wherein, said first means for maintaining the outboard ends of the flotation arm members at a spaced distance from one another comprises a generally U-shaped spacer bar operatively associated with both the outboard end of the ramp member and the outboard ends of the flotation arm members.

6. The buoyant platform as in claim 5; wherein, the ramp member includes a generally rectangular inclined center panel flanked by a pair of generally triangular side panels.

7. The buoyant platform as in claim 5; further comprising a generally U-shaped spacer bar operatively associated with both the outboard end of the ramp member and the outboard ends of the flotation arm members; and, a spacer rod operatively associated at least with the inboard end of the ramp member.

8. The buoyant platform member as in claim 7; wherein, the ramp member includes a generally rectangular inclined center panel flanked by a pair of generally triangular side panels.

9. The buoyant platform as in claim 8; wherein, the platform includes: an enlarged support panel dimensioned to overlie the inboard ends of the flotation arm members in their spaced relationship and having a plurality of apertures; and, a plurality of strap elements adapted to pass through said apertures and attach the support panel to the pair of flotation arm members.

10. The buoyant platform as in claim 9; wherein, said support panel is provided with a plurality of drainage slots.

11. The buoyant platform as in claim 10; wherein, the support panel has an inboard end provided with a contoured flange including an upwardly angled segment and a truncated segment.

12. The buoyant platform as in claim 9; wherein, said platform member is provided with at least a pair of apertures dimensioned to receive a tether for operatively connecting the platform member to an above waterline structure.

13. The buoyant platform as in claim 11; wherein, said truncated horizontal segment is provided with at least a pair of apertures dimensioned to receive a pair of tethers.

14. The buoyant platform as in claim 5; wherein, the outboard ends of the pair of flotation arm members are each provided with a pocket, and wherein, the upper ends of the spacer bar are further provided with rearwardly directed arm elements that are dimensioned to be received in said pockets.

15. The buoyant platform as in claim 1; wherein, the ramp member includes a generally rectangular inclined center panel flanked by a pair of generally triangular side panels.

16. The buoyant platform as in claim 15; wherein, said support panel is provided with a plurality of drainage slots.

17. The buoyant platform as in claim 16; wherein, the support panel has an inboard end provided with a contoured flange including an upwardly angled segment and a truncated segment.

18. The buoyant platform as in claim 17; wherein, said truncated horizontal segment is provided with at least a pair of apertures dimensioned to receive a pair of tethers.

* * * * *